July 5, 1927.

L. TRAVIS 1,634,698

CHAIN COUPLING AND TIGHTENER

Filed Feb. 25, 1927

Inventor:
Leonard Travis
By Monroe E. Miller
Attorney.

Patented July 5, 1927.

1,634,698

UNITED STATES PATENT OFFICE.

LEONARD TRAVIS, OF SIDNEY, IOWA.

CHAIN COUPLING AND TIGHTENER.

Application filed February 25, 1927. Serial No. 170,904.

The present invention relates to chain couplings and tighteners, and aims to provide a novel and improved device of that kind intended especially for use on the nonskid chains of automobile wheels, although useful for other purposes also.

It is the object of the invention to provide a device of simple and novel construction for conveniently connecting or coupling together the links of a tire chain or the like and for tensioning the chain to hold same tight.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
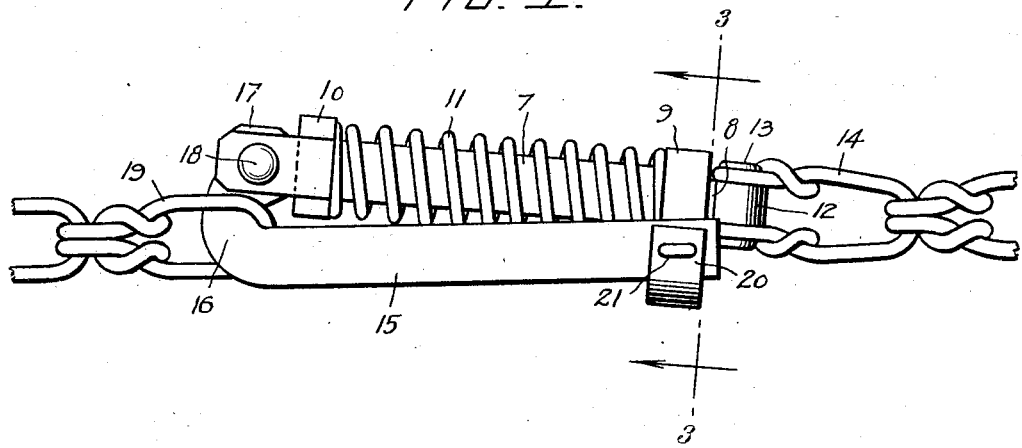
Figure 1 is a side elevation of the improved chain coupling and tightener.

In carrying out the invention there is provided a pair of overlapping bars 7 and 8 which have their overlapping or inner ends formed with the respective T-heads 9 and 10 for the abutment of the ends of a coiled spring 11 surrounding said bars.

The outer end of the bar 8 is formed with an eye 12 receiving a rivet 13 or other securing element for connecting the chain link 14 to said bar 8.

Figure 2:
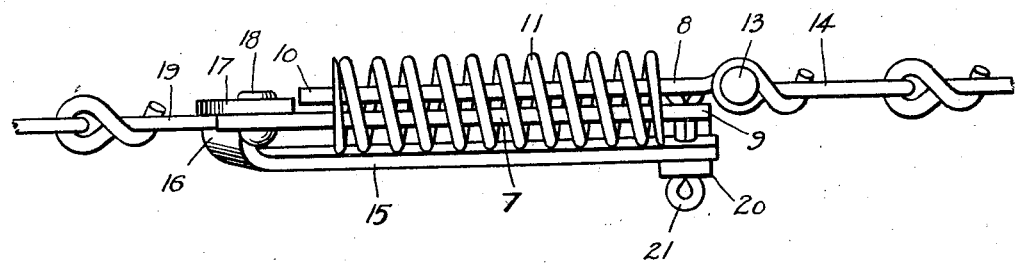
Fig. 2 is a top view of the parts as shown in Fig. 1.
Figure 3:
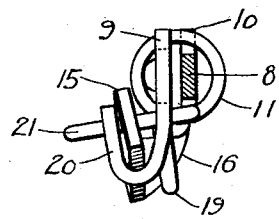
Fig. 3 is a cross section on the line 3—3 of Fig. 1.

A latch lever 15, also formed from a bar of suitable metal, has one end bent and twisted into a hook 16 which has the portion 17 overlapping the outer end portion of the bar 7 and pivoted thereto, by means of a rivet 18. The latch lever 15 is located at that side of the bar 7 opposite to the bar 8, and the link 19 opposite to the link 14 is adapted to be slipped on the lever 15, so that by swinging the lever 15 to the position shown in Figs. 1 and 2, the links 14 and 19 are drawn or pulled toward one another to tighten the chain, the link 19 seating in the hook 16.

The T-head 9 is formed with an extension at one end which is bent back to form a hook 20 into which the free end of the lever 15 may be moved, after the lever has been swung adjacent to the head 9, thereby preventing the links 14 and 19 from pulling apart, excepting as permitted by the compression of the spring 11. A cotter pin 21 or other securing element may be engaged through apertures in the hook 20, bar 15 and head 9 to prevent accidental disengagement of the lever 15 from said hook.

When the lever 15 is engaged with the proper link of the chain and then swung to tighten the chain, the spring 11 is compressed, thereby keeping the chain taut, and the spring will therefore take up any slack in the chain while the spring 11 is under compression.

The device is simple in construction and is readily manufactured, being composed principally of three bars and a spring.

Having thus described the invention, what is claimed as new is:—

1. A chain coupling and tightener comprising a pair of overlapping bars, said bars having T-heads at their overlapping ends, a coiled spring surrounding said bars and abutting at its ends against said heads, and a lever having a hook at one end pivoted to the end portion of one of said bars opposite to the head of said bar, said head having a bent back extension forming a hook to receive said lever.

2. A chain coupling and tightener according to the previous claim and including a securing element engageable through said hook, lever and head.

3. A chain coupling and tightener comprising a pair of overlapping members, a coiled spring surrounding them, said members having portions against which the ends of said spring abut, and a lever pivoted to one of said members at one end of the spring, said member being formed with a portion at the other end of the spring for the engagement of said lever therewith.

4. A chain coupling and tightener comprising a pair of overlapping members, a coiled spring surrounding them, said members having portions against which the ends of said spring abut, and a lever pivoted to one of said members at one end of the spring, said lever and one of said members being adapted to engage one another at the opposite end of the spring to hold the lever in position adjacent to the spring.

In testimony whereof I hereunto affix my signature.

LEONARD TRAVIS.